(12) United States Patent
Pan et al.

(10) Patent No.: US 11,275,198 B2
(45) Date of Patent: Mar. 15, 2022

(54) TERAHERTZ METAMATERIAL WAVEGUIDE AND DEVICE

(71) Applicants: Shenzhen Terahertz System Equipment Co., Ltd., Guangdong (CN); Shenzhen Institute of Terahertz Technology and Innovation, Guangdong (CN)

(72) Inventors: Yi Pan, Guangdong (CN); Shichang Peng, Guangdong (CN); Qing Ding, Guangdong (CN)

(73) Assignees: Shenzhen Terahertz System Equipment Co., Ltd., Guangdong (CN); Shenzhen Institute of Terahertz Technology and Innovation, Guangdong (CN)

( * ) Notice: Subject to any disclaimer, the term of this patent is extended or adjusted under 35 U.S.C. 154(b) by 309 days.

(21) Appl. No.: 16/336,771

(22) PCT Filed: Dec. 16, 2016

(86) PCT No.: PCT/CN2016/110335
§ 371 (c)(1),
(2) Date: Mar. 26, 2019

(87) PCT Pub. No.: WO2018/058802
PCT Pub. Date: Apr. 5, 2018

(65) Prior Publication Data
US 2020/0217984 A1    Jul. 9, 2020

(30) Foreign Application Priority Data
Sep. 30, 2016 (CN) .......................... 201610871738.4

(51) Int. Cl.
G02B 1/00 (2006.01)
G02B 6/10 (2006.01)
G02B 6/122 (2006.01)

(52) U.S. Cl.
CPC ............. G02B 1/002 (2013.01); G02B 6/107 (2013.01); G02B 6/1226 (2013.01)

(58) Field of Classification Search
CPC ...... G02B 1/002; G02B 1/1226; G02B 1/108; H01Q 21/00
See application file for complete search history.

(56) References Cited

U.S. PATENT DOCUMENTS 6,239,422 B1 * 5/2001 Vang ........................ G02B 6/42
250/208.2
6,640,034 B1 * 10/2003 Charlton ................ B82Y 20/00
385/122

(Continued)

FOREIGN PATENT DOCUMENTS

CN    101630040 A    1/2010
CN    102751586 A    10/2012

(Continued)

*Primary Examiner* — Ryan A Lepisto
*Assistant Examiner* — Erin D Chiem
(74) *Attorney, Agent, or Firm* — Maier & Maier, PLLC

(57) ABSTRACT

A terahertz metamaterial waveguide and device are provided. The terahertz metamaterial waveguide comprises a subwavelength substrate layer and a metal layer. One surface of the subwavelength substrate layer is plated with the metal layer, and a plurality of periodically-distributed micropores is formed in the metal layer. The subwavelength substrate layer, the metal layer, and the formed plurality of periodically-distributed micropores are described.

18 Claims, 3 Drawing Sheets

(56) References Cited

U.S. PATENT DOCUMENTS

2004/0028875 A1* 2/2004 Van Rijn .............. B01D 67/002
                                                    428/98
2007/0165295 A1   7/2007 Kim et al.
2012/0019901 A1* 1/2012 Mazumder .............. G02F 1/313
                                                    359/320

FOREIGN PATENT DOCUMENTS

| CN | 103247861 A | 8/2013 |
| CN | 103247862 A | 8/2013 |
| CN | 206114928 U | 4/2017 |
| JP | 4950769 B2  | 6/2012 |

* cited by examiner

TERAHERTZ METAMATERIAL WAVEGUIDE AND DEVICE

CROSS-REFERENCE TO RELATED APPLICATION(S)

This application is a 371 application of International Application No. PCT/CN2016/110335, filed on Dec. 16, 2016, which claims priority to Chinese Patent Application No. 201610871738.4, filed on Sep. 30, 2016, the contents of both of which are herein incorporated by reference in their entireties.

TECHNICAL FIELD

The embodiment of the invention belongs to the technical field of terahertz waveguides and particularly relates to a terahertz metamaterial waveguide and device.

BACKGROUND

A terahertz waveguide is a key component of a terahertz system and device and plays an important role in its application to terahertz remote energy transmission, biochemical sensors and terahertz integrated devices.

However, the existing terahertz waveguide structures usually cannot meet the transmission demands of the terahertz waves without a relatively large thickness, and accordingly, resulting in the high transmission loss of terahertz waves results and increasing the manufacturing costs.

Technical Problem

The invention aims at providing a terahertz metamaterial waveguide and device for solving the problems of relatively high transmission loss of terahertz waves and increased manufacturing costs due to the existing terahertz waveguide structure not usually being able to meet the transmission demands of the terahertz waves without a relatively large thickness.

SUMMARY

Solution of the Problem

Technical Scheme

The invention is realized in a such way that a terahertz metamaterial waveguide comprises a subwavelength substrate layer and a metal layer, one surface of the subwavelength substrate layer is plated with the metal layer, and a plurality of periodically-distributed micropores are formed in the metal layer.

Preferably, the micropores are distributed like a matrix array or a regular hexagon.

Preferably, the structural period range of the micropores is from 50 microns to 100 microns, and the aperture range of the micropores is from 40 microns to 75 microns.

Preferably, the micropores are round holes or regular polygon holes.

Preferably, the thickness range of the subwavelength substrate layer is from 12 microns to 100 microns.

Preferably, the subwavelength substrate layer is made of a polyester film, Teflon, silicon or germanium.

Preferably, the metal layer is made of gold, silver, aluminum or copper.

Preferably, the micropores are formed via a photo-etching method, a chemical etching method or a laser cutting technology.

Preferably, the metal layer is plated at the surface of the subwavelength substrate layer via a thermal vapor deposition method.

The invention also provides a terahertz device comprising the terahertz metamaterial waveguide.

Beneficial Effects of the Invention

Beneficial Effects

In comparison with the prior art, the invention has the beneficial effects as follows:

By using the subwavelength substrate layer, and plating the surface of the subwavelength substrate layer with the metal layer, in which a plurality of periodically-distributed micropores are formed, the thickness of the terahertz waveguide and the transmission loss of terahertz waves transmitted in the terahertz waveguide can be reduced greatly, and manufacturing costs are lowered.

BRIEF DESCRIPTION OF DRAWINGS

In order to describe the technical solutions in the embodiments of the invention more clearly, a simple introduction to the accompanying drawings which are needed in the embodiments is given below. Apparently, the accompanying drawings in the description below are merely some of the embodiments of the invention, based on which other drawings may be obtained by those of ordinary skill in the art without any creative effort.

DETAILED DESCRIPTION

Embodiments of the Invention

Figure 1:
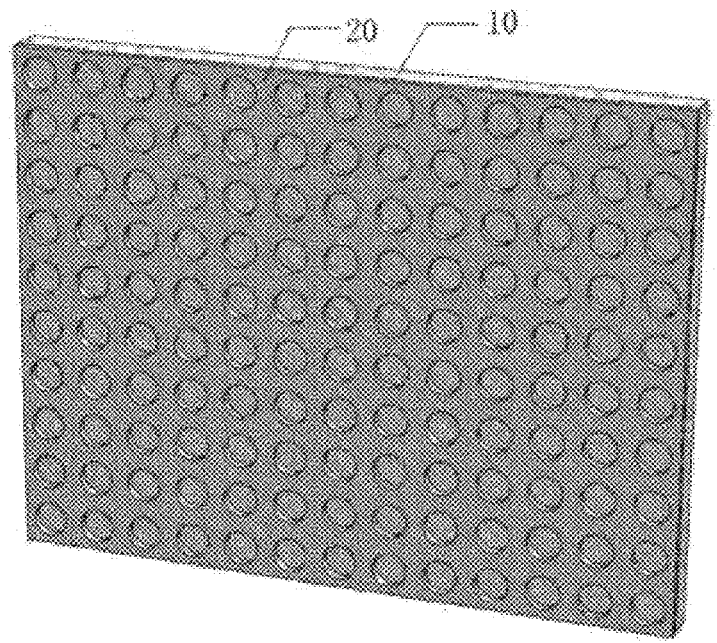
FIG. 1 is a stereochemical structural schematic diagram of the terahertz metamaterial waveguide provided by the embodiment of the invention.

In order to help the personnel in the technical field better understand the scheme of the invention, the technical scheme in the embodiment is described clearly in combination with the accompanying drawings in the embodiments. Apparently, the embodiments described are merely some of the embodiments of the invention rather than all the embodiments. Based on the embodiments of the invention, all other embodiments obtained by ordinary technicians in the field without producing creative work shall fall within the scope of the protection of the invention.

The terms "include" in the specification and claims of the invention and in the drawings above and any variation thereof are intended to cover exclusive inclusions.

As shown in FIG. 1, the terahertz metamaterial waveguide provided by the embodiment comprises a subwavelength substrate layer 10 and a metal layer 20. One surface of the subwavelength substrate layer 10 is plated with the metal layer 20, and a plurality of periodically-distributed micropores 21 is formed in the metal layer 20.

In a specific application, one surface of the subwavelength substrate layer is one of the two surfaces with the biggest areas.

In the specific application, the micropores 21, distributed like a matrix array or a regular hexagon, specifically can be round holes, regular polygon holes or holes in other regular holes and can be set based on the actual needs. In FIG. 1, the micropores 21 are round holes distributed like a matrix-like array.

The structural period range of the micropores 21 is from 50 microns to 100 microns, and the aperture range of the micropores is from 40 microns to 75 microns.

In one embodiment, the micropores 21 are square holes having the structural period of 50 microns and the aperture of 40 microns.

In one embodiment, the micropores 21 are square holes having the structural period of 100 microns and the aperture of 75 microns.

In one embodiment, the micropores 21 are square holes having the structural period of 150 microns and the aperture of 100 microns.

In the specific application, the side length and the structural period of the micropores can be set based on the actual need, and the dimension and the structural period of the micropores can be adjusted based on the cut-off frequency demands of the fundamental mode of the terahertz metamaterial waveguide. In the embodiment, the square holes with the structural period of 150 microns and the aperture of 100 microns are chosen.

Figure 2:
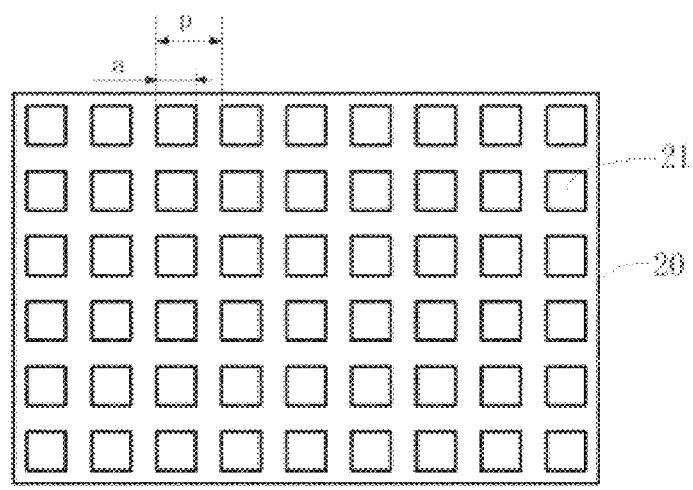
FIG. 2 is a structural schematic diagram of the metal layer provided by one embodiment of the invention.

FIG. 2 shows the structural schematic diagram of the metal layer, in which square holes distributed in a matrix-like array are formed, provided by the embodiment of the invention. In FIG. 2, p is the structural period of the micropores 21, and a is the aperture of the micropores 21.

Figure 3:
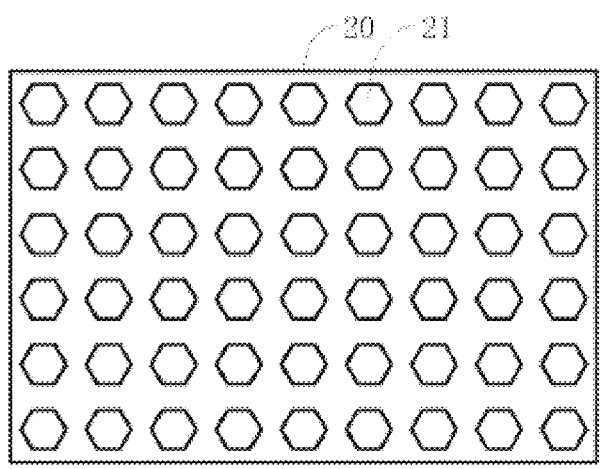
FIG. 3 is a structural schematic diagram of the metal layer provided by one embodiment of the invention.

FIG. 3 shows the structural schematic diagram of the metal layer, in which regular hexagon holes distributed in a matrix-like way array are formed, provided by the embodiment of the invention.

Figure 4:
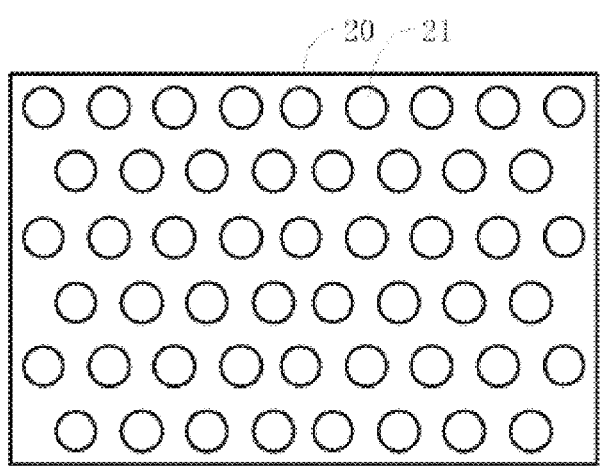
FIG. 4 is a structural schematic diagram of the metal layer provided by one embodiment of the invention.

FIG. 4 shows the structural schematic diagram of the metal layer, in which round holes distributed like a regular hexagon are formed, provided by the embodiment of the invention.

In the specific application, the subwavelength substrate layer can be made of a polyester film, teflon, silicon, or germanium, and also can be made of other subwavelength materials. In the embodiment, the subwavelength substrate layer is made of the polyester film having a refraction index of ~1.6 (about 1.6) in the terahertz frequency band.

In the specific application, the thickness range of the subwavelength substrate layer can be 12 microns to 100 microns and other thicknesses also can be selected based on the actual need. Changing the thickness of the subwavelength substrate layer may change the transmission characteristics of the terahertz metamaterial waveguide. In the embodiment, the thickness of the subwavelength substrate layer can be 12 microns, 36 microns or 50 microns.

In the specific application, the thickness of the metal layer can be set based on the actual need. Metal layers with different thicknesses may change the transmission characteristics of the terahertz metamaterial waveguide. In the embodiment, the metal layer is 200 nm thick.

Figure 5:
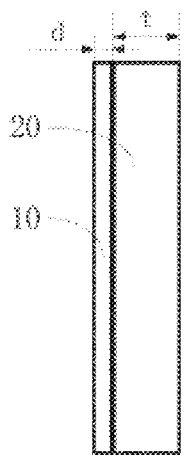
FIG. 5 is a side view of the terahertz metamaterial waveguide provided by the embodiment of the invention.

FIG. 5 shows the side view of the terahertz metamaterial waveguide provided by one embodiment of the invention. In FIG. 5, t is the thickness of the subwavelength substrate layer and d represents the thickness of the metal layer.

In the specific application, the metal layer may be made of gold, silver, aluminum, copper, or other metals. In the embodiment, the metal layer is made of silver.

In the specific application, the micropores can be formed via a photo-etching method, a chemical etching method, or a laser cutting technology.

In the specific application, the metal layer can be plated at one surface of the subwavelength substrate layer via a thermal vapor deposition method.

In one embodiment, the preparation method of the terahertz metamaterial waveguide specifically comprises the steps of etching the micropores in the metal material via the photo-etching method, making the metal layer into a mask and then plating the metal layer at one surface of the subwavelength substrate layer via the thermal vapor deposition method.

In the specific application, the dimension of a single terahertz metamaterial waveguide can be set based on the actual application need. In the embodiment, the terahertz metamaterial waveguide is 40 mm long and 6 mm wide.

Figure 6:
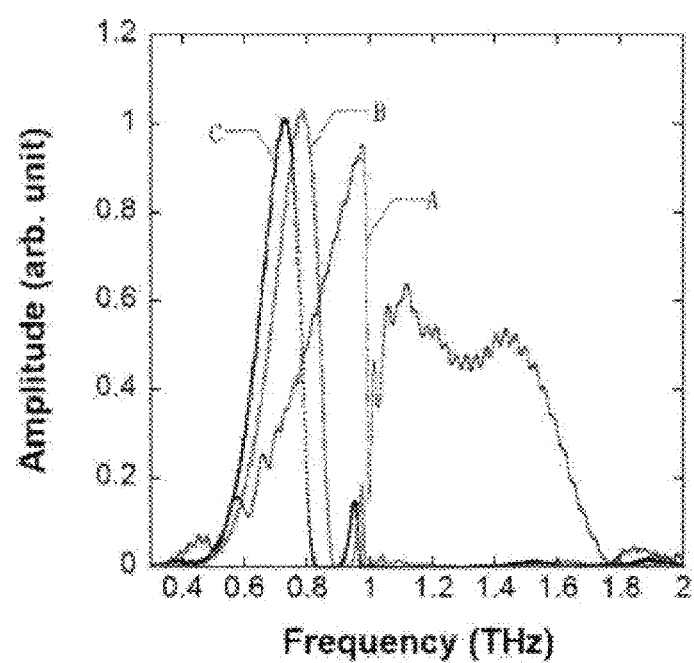
FIG. 6 is a terahertz wave transmission spectrum simulation diagram of the terahertz metamaterial waveguide provided by the embodiment of the invention.

FIG. 6 shows the transmission characteristic simulation diagram of the terahertz waves obtained when terahertz waves are transmitted by adopting the terahertz metamaterial waveguide provided by the embodiment of the invention; the horizontal axis represents the frequency of the terahertz waves (unit is THz), and the lengthways axis is the amplitude of the terahertz waves (the unit can be user-defined and is shown as arb.unit in FIG. 6; curves A, B, and C separately are the transmission characteristic curves of corresponding terahertz waves when the thickness of the subwavelength substrate layer are 12 microns, 36 microns, and 50 microns respectively.

In FIG. 6, when the subwavelength substrate layer is 12 microns thick, the corresponding terahertz wave transmission characteristic curve has an obvious forbidden band at 1.0 THz, which is determined by the border of the Brillouin zone of the metal layer and has the cut-off frequency of 300 microns (1.0 THz). The terahertz waves with the frequency less than 10 THz are a TEM fundamental mode determined by the structure of the metal layer, but the terahertz waves with the frequency larger than 10 THz are a high-order TM1 mode determined by the structure of the whole terahertz metamaterial waveguide.

In a similar way, the cut-off frequency of the corresponding terahertz wave transmission characteristic curve is still 1.0 THz when the subwavelength substrate layer is 36 microns or 50 microns thick.

It is worth noting that there is no high-order mode with the frequency beyond 1.0 THz in the corresponding terahertz wave transmission characteristic curve when the subwavelength substrate layer is 36 microns or 50 microns thick, and the main reason for that is the thickening of the polyester film enhances absorption loss. At the same time, the TEM mode (Transverse Electromagnetic Mode) is divided into two wave bands, and cut-off frequencies less than 1.0 THz appear separately; and the reason for that is the thickness of the polyester film material adjusts the effective refraction index of the terahertz metamaterial waveguide.

The terahertz metamaterial waveguide provided by the embodiment can adjust the transmission characteristics such as the frequency, bandwidth and chromatic dispersion, of the terahertz waves by changing the structure of the metal layer as well as the material and thickness of the subwavelength substrate layer. Due to the thin metal layer and the thin subwavelength substrate layer, the thickness of the terahertz metamaterial waveguide and the transmission loss of the terahertz waves can be reduced efficiently, and the manufacturing cost is saved; the terahertz metamaterial waveguide can be prepared via a metal plating method and is easy to process.

The invention also provides a terahertz device comprising the terahertz metamaterial waveguide.

In the specific application, the terahertz device specifically may be a terahertz energy transmission type device, a biochemical sensor, a terahertz two-dimensional on-chip chip and etc.

The description aforementioned is merely the preferred embodiments of the invention rather than restrictions on the invention. Any modifications, equivalent changes and modifications within the spirit and the principle of the invention shall fall in the scope of the protection of the invention.

What is claimed is:

1. A terahertz metamaterial waveguide, comprising a subwavelength substrate layer and a metal layer, wherein one surface of the subwavelength substrate layer is plated with the metal layer, and a plurality of periodically-distributed micropores are formed in the metal layer, the metal layer is 200 nm thick and the subwavelength substrate layer has a refraction index of about 1.6 in the terahertz frequency band.

2. The terahertz metamaterial waveguide according to claim 1, wherein the micropores are distributed like a matrix array or a regular hexagon.

3. The terahertz metamaterial waveguide according to claim 1, wherein the structural period range of the micropores is from 50 microns to 100 microns, and the aperture range of the micropores is from 40 microns to 75 microns.

4. The terahertz metamaterial waveguide according to claim 1, wherein the micropores are round holes or regular polygon holes.

5. The terahertz metamaterial waveguide according to claim 1, wherein the thickness range of the subwavelength substrate layer is from 12 microns to 100 microns.

6. The terahertz metamaterial waveguide according to claim 1, wherein the subwavelength substrate layer is made of at least one of: a polyester film, teflon, silicon or germanium.

7. The terahertz metamaterial waveguide according to claim 1, wherein the metal layer is made of at least one of: gold, silver, aluminum or copper.

8. The terahertz metamaterial waveguide according to claim 1, wherein the micropores are formed using at least one of a photo-etching method, a chemical etching method or a laser cutting technology.

9. The terahertz metamaterial waveguide according to claim 1, wherein the metal layer is plated at the surface of the subwavelength substrate layer using a thermal vapor deposition method.

10. A terahertz device, comprising a terahertz metamaterial waveguide, wherein the terahertz metamaterial waveguide comprises a subwavelength substrate layer and a metal layer, wherein one surface of the subwavelength substrate layer is plated with the metal layer, and a plurality of periodically-distributed micropores are formed in the metal layer, the metal layer is 200 nm thick and the subwavelength substrate layer has a refraction index of about 1.6 in the terahertz frequency band.

11. The terahertz device of claim 10, wherein the micropores are distributed like a matrix array or a regular hexagon.

12. The terahertz device of claim 10, wherein the structural period range of the micropores is from 50 microns to 100 microns, and the aperture range of the micropores is from 40 microns to 75 microns.

13. The terahertz device of claim 10, wherein the micropores are round holes or regular polygon holes.

14. The terahertz device of claim 10, wherein the thickness range of the subwavelength substrate layer is from 12 microns to 100 microns.

15. The terahertz device of claim 10, wherein the subwavelength substrate layer is made of at least one of: a polyester film, teflon, silicon or germanium.

16. The terahertz device of claim 10, wherein the metal layer is made of at least one of: gold, silver, aluminum or copper.

17. The terahertz device of claim 10, wherein the micropores are formed using at least one of: a photo-etching method, a chemical etching method or a laser cutting technology.

18. The terahertz device of claim 10, wherein the metal layer is plated at the surface of the subwavelength substrate layer using a thermal vapor deposition method.

* * * * *